United States Patent

[11] 3,583,383

| [72] | Inventor | Herbert C. Ovshinsky |
| | | Oak Park, Mich. |
| [21] | Appl. No. | 725,753 |
| [22] | Filed | May 1, 1968 |
| [45] | Patented | June 8, 1971 |
| [73] | Assignee | Wheel Trueing Tool Company |
| | | Detroit, Mich. |

[54] DRILLING DEVICE WITH COOLANT SUPPLY
10 Claims, 4 Drawing Figs.

[52] U.S. Cl. .................................................. 125/20,
51/356, 77/55
[51] Int. Cl. .................................................... B28d 1/18,
B24b 54/02, B23b 47/00
[50] Field of Search ............................................ 77/55.3;
51/356; 125/20; 222/402.21, 402.13

[56] References Cited
UNITED STATES PATENTS

| 3,158,292 | 11/1964 | O'Donnell | 222/402.13X |
| 3,003,493 | 10/1961 | Miller | 125/20 |
| 2,996,061 | 8/1961 | Miller | 125/20 |
| 2,635,399 | 4/1953 | West | 51/266X |
| 3,243,924 | 4/1966 | Peters | 57/356 |

*Primary Examiner*—Harold D. Whitehead
*Attorney*—Harness, Dickey and Pierce

ABSTRACT: A drilling device adapted to be connected to a source of pressurized gaseous coolant and to a rotary tubular abrasive drill bit adapted to be connected to a source of power for portable use in the drilling of holes in vitreous or ceramic material, such as glass, tile, porcelain, cement, stone, and the like.

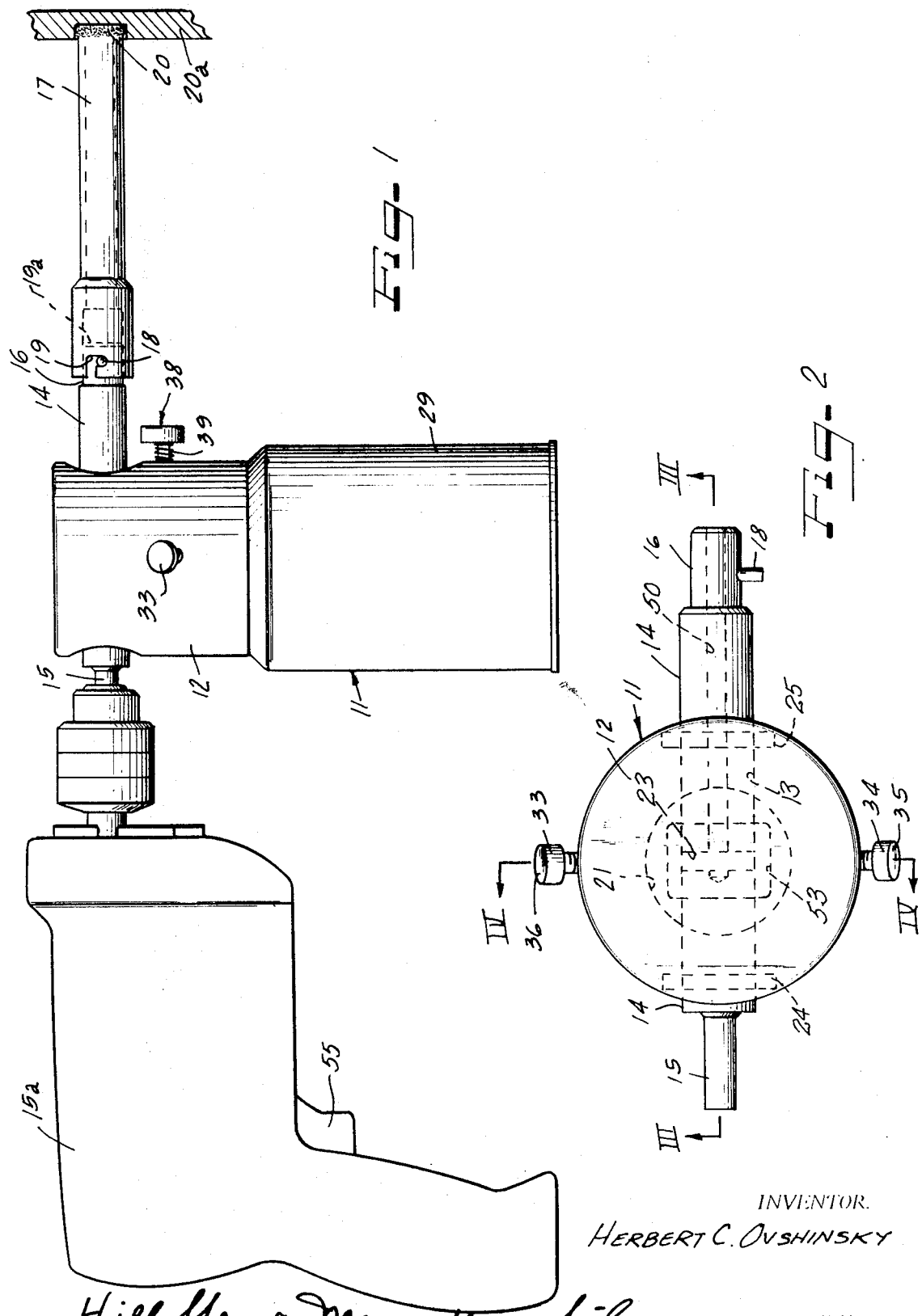

INVENTOR.
HERBERT C. OVSHINSKY

DRILLING DEVICE WITH COOLANT SUPPLY

BACKGROUND OF THE INVENTION

1. Field of the Invention

A drilling device having provisions for cooling the drill bit and workpiece.

2. Description of the Prior Art

It is commonly known, in the drilling of vitreous, ceramic and masonry materials such as glass, tile, marble, brick, stone, concrete and the like, that the furnishing of a continuous stream of fluid coolant to the immediate cutting area enables the drilling operation to be performed at high speeds and with minimum overheating of the abrasive elements.

This method is generally accomplished most efficiently by feeding the stream of cooling fluid, usually water, cutting oils or other liquid under pressure, into and through a hollow drill bit and around the immediate cutting area. In such an operation the coolant is supplied under pressure so as to be forcibly fed radially outwardly of the cutting edge, thereby functioning to dissipate frictional heat in both the drill bit and the workpiece.

However, satisfactory operation is often times difficult to realize since problems can arise in supplying an adequate amount of coolant at sufficient pressures to enable the coolant to effectively function, as for example, when an appreciable extent of drilling has taken place.

Furthermore, the use of a liquid such as cooling oil or water to cool the bit raises the problems of requiring a sufficient supply of liquid adjacent to the location of the drilling and the corresponding necessity for the cumbersome pipes or hoses for supply or removal of such liquid.

SUMMARY

The present invention resolves the foregoing difficulties by providing a compact, inexpensive, portable device easily attachable to the drive spindle of a motor and which supplies adequate amounts of coolant at sufficiently high volume rate of flow to enable the drill bit to be operated over an extended period of time at high drilling speeds. This device has a casing which is composed of a self-lubricating plastic that provides excellent bearing, antifriction and antiwear characteristics, which contains a control device for the coolant incorporated in the casing, and which has a shaft rotatably mounted therein. The deformable resiliency of the plastic enables the shaft to be snap-fitted into the casing thereby minimizing the number of parts and reducing manufacturing costs. An outwardly projecting shaft portion is provided with securement means for rigidly mounting hollow drill bits thereon in order that the drill bits may be firmly supported during a drilling operation.

One face of the casing is provided with a boss to allow the attachment to the casing of a pressurized container for a gaseous coolant such as one of the Freons or mixtures thereof, or other liquefied, normally gaseous fluid. Also associated with the casing is means for selectively controlling the rate of fluid coolant flow into the drill bit. Securement means are also provided in the casing for attaching the container so that it can be operated in a completely portable manner as a unitary part of the drill assembly without the necessity for additional supply or evacuation means for the coolant.

BRIEF DESCRIPTION OF THE DRAWINGS

FIG. 1 is a side elevation view of the complete drill assembly showing the attached container of gaseous coolant and the tubular drill bit;

FIG. 2 is a top plan view of the casing with its integral shaft for attachment to the drill power source and a pin for the bayonet-type securement of the hollow rotary drill bit;

DESCRIPTION OF THE PREFERRED EMBODIMENT

Figure 3:
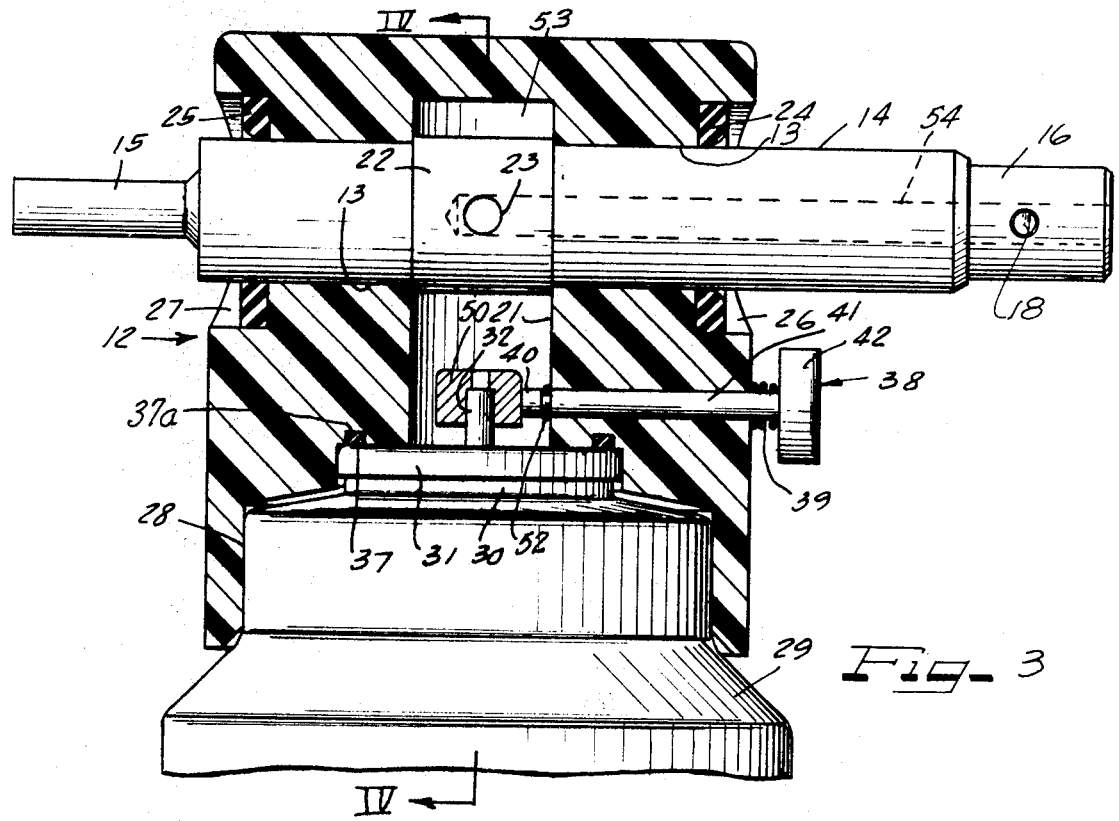
FIG. 3 is a cross-sectional view of the casing and coolant container with its control means taken along lines III-III of FIG. 2, with parts shown in elevation.

In the FIGS. 1 and 2 the reference numeral 11 designates the drill bit fluid coolant feeding device of this invention having a casing 12 with a through-bore 13 for receiving a hollow shaft 14 rotatably mounted therein. Such casing 12 is preferably composed of Teflon, Delrin or an equivalent plastic material having self-lubricating properties in order to minimize the friction developed between the stationary casing 12 and the rotating shaft 13.

The hollow shaft 13 is provided with a reduced shank portion 15 adapted to be drivingly received by the motor 15a of an electric drill and another axially opposed shank portion 16 which can engage and drive the hollow drill bit 17.

A pin member 18 outwardly extending from the shank portion 16 is provided for said engagement in a bayonet slot 19 positioned in the mounting sleeve 19a of the hollow drill bit 17, thereby insuring rigid support of the drill bit 17 during the drilling operation. In such operation, the drill bit 17 is inserted over the shank portion 16 and rigidly secured thereto by properly positioning the pin 18 in the bayonet slot 19 of the drill bit mounting sleeve 19a. If desired the bayonet slot can be T-shaped to allow for reversible drilling or the shank portion 16 could be threaded for mounting drill bits with the standard threaded ends.

As herein shown by way of example only, the drill bit 17 includes a cutting end 20 consisting of a diamond-impregnated matrix which affords a circular cutting edge. In such drilling a circular groove is cut into the workpiece 20a keeping the end of the hollow bit 17 blocked until the material is drilled completely through.

The through-bore 13 opens into a transverse inlet chamber 21 within said casing 12. In the preferred embodiment, an enlarged midportion 22 of an axial extent equal to the width of said chamber 21 is formed integral with the shaft 14 to position the shaft against axial movement relative to said casing 12. The diameter of the enlarged portion 22 is greater than the diameter of the through-bore 13 in its unstressed condition and thereby serves to securely retain the shaft 14 in the through-bore 13 and assure proper alignment of the inlet chamber 21 with one or more transverse bores 23 which are formed in said enlarged portion 22 and that communicate with an axial bore 54 in said shaft 14. Manufacture of the assembly is facilitated by reason of the fact that the casing 12 is composed of a self-lubricating plastic material which is also deformable so as to enable the enlarged portion 22 to pass through the through-bore 13 and into position in the inlet chamber 21, thus permitting the shaft 14 to be snap-fitted into place.

Escape of the fluid coolant along the shaft 14 to the exterior of the casing 12 is prevented by means of two seal rings 24 and 25 which may be O-rings and are press-fitted into recesses 26 and 27 of the casing 12, respectively, to sealingly engage the shaft 14.

Figure 4:
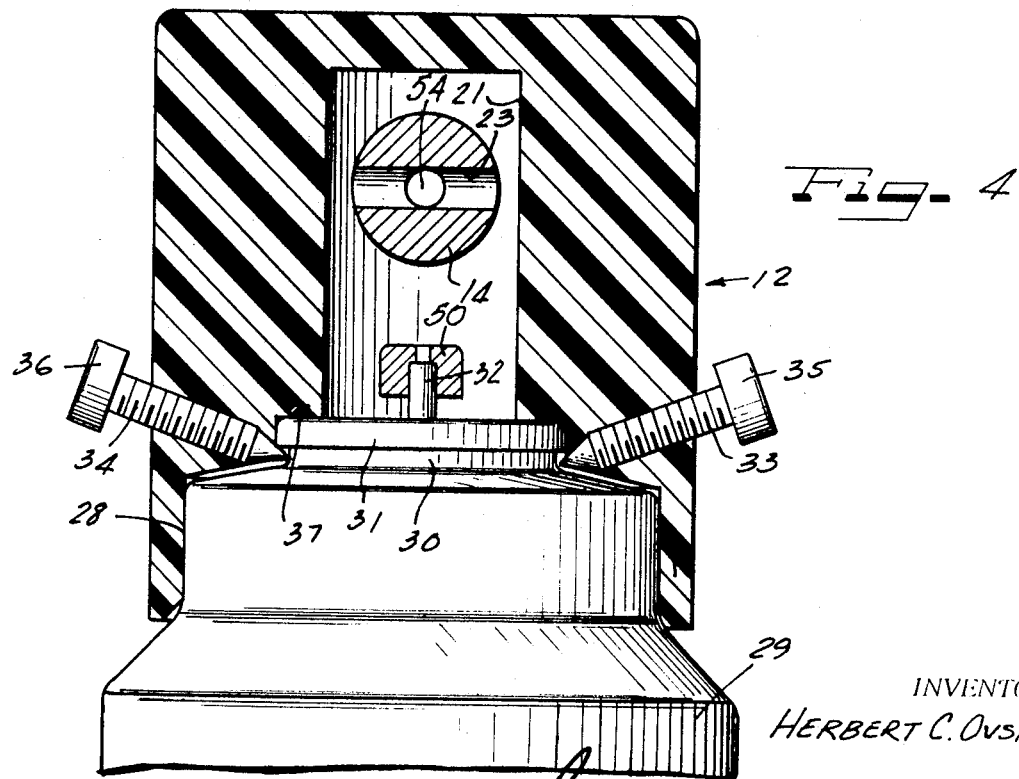
FIG. 4 is a cross-sectional view of the casing with its securement means for the coolant container taken along lines IV-IV of FIG. 2, with parts shown in elevation.

The transverse inlet chamber 21 opens into a hollow cylindrical boss 28 integral with said casing 12 and forming a lower extension thereof. The hollow boss 28 is provided for receiving the upper end of a container 29 of a pressurized normally gaseous coolant such as Freon or the like. The container 29 can be of the usual aerosol-type. The container 29, as shown in FIGS. 3 and 4, has a cylindrical neck 30 of reduced diameter, a flanged top 31, and a valve mechanism within the container which can be actuated by a laterally applied force against the projecting free end of a discharge element 32 forming a part of said valve mechanism.

The securement of the container 29 to the casing 12 is accomplished by the engagement with the container 29 of one or more screws 33 and 34 threaded through said casing 12 and provided with pointed ends that can be positioned against the reduced neck 30 below the flange 31. The screws 33 and 34, when sufficiently withdrawn, facilitate the positioning of the top of the pressurized valve-controlled aerosol container 29 within the boss 28. Once the container 29 is inserted into the hollow boss 28 the screws 33 and 34 are then turned so that their pointed ends engage said container 29 between the neck 30 and the flange top 31, thereby securing said container 29 to the casing 12 in such a way as to properly locate the projecting valve element 32 within the inlet chamber 21. Said screws 33 and 34 also have enlargements or heads 35 and 36 for ease of manipulation.

An annular groove 37a is formed in an inner downwardly facing surface of the casing 12 for receiving an O-ring 37 therein to provide a seal between the inlet chamber 21 and the flange top 31 of the container. The O-ring seal 37 seated in the groove 37a keeps the fluid coolant when released from escaping between the hollow boss 28 and the container 29 into the atmosphere.

In the embodiment chosen, a headed plunger member 38 is provided for axial movement through the casing 12 into the inlet chamber 29 for tilting the valve element 32 to actuate the valve mechanism. A spring 39 concentrically disposed about said plunger member 38 between its headed end 42 and the container 29 serves to return said plunger member 28 to its original position when released. Although a spring is used here other types of damper means could be applied to the plunger member 38. The inner end 40 of the plunger 38 is attached to or adapted to bear against a protective cap 50 securely positioned on the free end of the valve element 32, and is provided with an axial bore 51 aligned with the bore of said valve element. The plunger stem 41 extends into the inlet chamber 21 with an O-ring seal 52 sealing its entrance thereinto and serves to displace the cap 50 and hence tilt the valve element 32 when it is desired to open the valve of the aerosol container 29. Thereupon, the coolant is released into the inlet chamber 21 for flow into the hollow shaft 14. The enlarged head 42 facilitates such manipulation of the plunger.

When the motor trigger 55 is depressed and the plunger 38 is actuated, the coolant is released as an aerosol and flows under its own pressure from the inlet chamber 21 into the hollow shaft 13 through the transverse bores 23 provided in the shaft 13. By properly dimensioning the outer diameter of the enlarged shaft portion 22 relative to the inlet chamber 21, there is provided a space 53 surrounding said shaft portion, enabling the coolant to enter the transverse bores 23 for flow along the longitudinal bore 54 within the hollow shaft 13 into the hollow drill bit 17, and for discharge at the cutting end 20 between said end and the workpiece 20a.

The cooling effect at the working end of the drill 17 is due to the vaporization of any remaining liquefied gases and to the drop in pressure that occurs upon release of the aerosol. The Freon or mixture of Freons used is normally gaseous product but has been held liquified under pressure in the container 29 for discharge upon release as an aerosol. The dissipation of the Freon into gaseous form thereby effects the cooling of the drill bit 17 and the workpiece 20a. Such cooling occurs at the area of the workpiece 20a that is being drilled because the Freon does not completely gasify until reaching that point. This is where the cooling effect is most needed, namely between the working face of the drill 20 and the walls of the hole being drilled in the workpiece 20a. Since the delivered Freon is gasified, the gas blows the cuttings from the hole as it is being drilled.

Although minor modifications might be suggested by those versed in the art, it should be understood that I wish to embody within the scope of the patent granted hereon all such modifications as reasonably and properly come within the scope of my contribution to the art.

I claim as my invention:

1. A drilling device comprising:
    a casing having a through-bore, a hollow shaft mounted for rotation in said bore and having a driven end for connection to a motor and driving end for connection to a hollow drill bit,
    said casing having a chamber extending transversly of said bore,
    said hollow shaft having an aperture to said chamber,
    means associated with said casing for detachably attaching thereto a pressurized valve-controlled fluid coolant container with the valve thereof extending into said chamber,
    and means carried by said casing and operable to actuate said valve to effect fluid flow of the coolant of said container through said chamber and said aperture into said hollow shaft for passage into said hollow drill bit.

2. A drilling device as defined in claim 1, further characterized by the casing being formed of a self-lubricating and a deformable plastic.

3. A drilling device as defined in claim 2, further characterized by said hollow shaft having an enlarged portion having a diameter greater than the diameter of said through-bore in the unstressed condition, and said deformable casing and through-bore being adapted to receive said enlarged portion to enable said shaft to be snap-fitted into said through-bore.

4. A drilling device as defined by claim 1, further characterized by said transverse chamber being slightly larger than said shaft adjacent said aperture to enable continuous flow of fluid coolant from said chamber into said aperture.

5. A drilling device as defined in claim 1, further characterized by said means for detachably attaching said coolant container comprising:
    a hollow boss integral with the casing for connectably receiving said coolant container, said hollow boss being in communication with said transverse chamber,
    said container having a discharge valve sealably enclosed within said transverse chamber,
    at least one means threaded through said casing and engaging said container,
    means provided on said threaded means for facilitating manipulation of said threaded means.

6. A drilling device as defined by claim 5, further characterized by said actuating means comprising:
    a plunger means passing through said casing, means to return said plunger to its original position when not in use,
    stop means to prevent said plunger from falling out of said casing,
    means for engaging and actuating said discharge valve of said container,
    thereby releasing said coolant and controlling the flow thereof.

7. A drilling device as defined in claim 1, further characterized by said driving end for connection to a hollow drill bit comprising:
    a shank portion having an outwardly extending pin member cooperable with a bayonet slot in said hollow drill bit for rigidly securing said drill bit to said shank portion.

8. A portable drilling device comprising: a casing of insulating material having an open-ended shaft-receiving through-bore and connected chamber formed therein, a hollow shaft rotatably mounted in said bore having a shaft portion operatively connectable to a portable electric drill and a second shank portion rigidly connectable to a hollow drill bit, said casing having an inlet to said chamber formed therein connectable to a pressurized aerosol container of a liquefied normally gaseous coolant, means on said casing for supporting an aerosol container, said hollow shaft having at least one aperture in fluid flow communication with said chamber to the interior of said shaft.

9. In a portable drilling device, a shaft having a drive end connectable to a portable drill motor having an actuatable trigger and an opposite end for supporting a drill, said shaft having a passageway to the drill supporting end from an inlet through the shaft wall, closure means for said inlet having a passageway communicating with said inlet, means for securing a pressurized valve controlled fluid coolant container having an outlet to said closure means with the outlet in the passageway thereof, and means for operating the valve of said container independent of and simultaneously with the actuatable trigger.

10. In combination, a pressurized valve-controlled fluid dispensing container of the lightweight aerosol-type, a driven hollow drill bit having a working end for drilling a hole, and passaged connecting means supporting said container and located between said container and said hollow drill bit for dispensing said fluid from said container through said hollow bit to cool said working end and to blow cuttings from the hole during a drilling operation.